(12) United States Patent
Kang et al.

(10) Patent No.: US 7,744,265 B2
(45) Date of Patent: Jun. 29, 2010

(54) BACKLIGHT ASSEMBLY WITHOUT A BOTTOM CHASSIS

(75) Inventors: Sang-Min Kang, Chungcheongnam-do (KR); Jeoung-Gwen Lee, Gyeonggi-do (KR); Tae-Hyung Kim, Gyeonggi-do (KR); Jun-Hee Son, Gyeonggi-do (KR); Chang-Hoi Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/509,243

(22) Filed: Aug. 23, 2006

(65) Prior Publication Data

US 2007/0047265 A1 Mar. 1, 2007

(30) Foreign Application Priority Data

Aug. 24, 2005 (KR) ............... 10-2005-0077660

(51) Int. Cl.
*F21V 7/04* (2006.01)
(52) U.S. Cl. .................. 362/633; 257/84; 349/58; 362/606
(58) Field of Classification Search ......... 362/633, 362/632, 634, 609, 606, 561, 613; 349/58, 349/68; 257/84
See application file for complete search history.

(56) References Cited

U.S. PATENT DOCUMENTS

| | | | | |
|---|---|---|---|---|
| 5,064,276 A | * | 11/1991 | Endo et al. | 349/64 |
| 5,119,204 A | * | 6/1992 | Hashimoto et al. | 348/794 |
| 5,453,855 A | * | 9/1995 | Nakamura et al. | 349/58 |
| 5,583,681 A | * | 12/1996 | Shioya et al. | 349/60 |
| 5,769,521 A | * | 6/1998 | Osawa et al. | 362/27 |
| 5,838,412 A | * | 11/1998 | Ueda et al. | 349/150 |
| 6,175,396 B1 | * | 1/2001 | Kim et al. | 349/58 |
| 6,504,586 B1 | * | 1/2003 | Lee | 349/58 |
| 6,741,299 B2 | * | 5/2004 | Fukayama et al. | 349/58 |
| 6,828,721 B2 | * | 12/2004 | Wakita | 313/491 |
| 6,835,961 B2 | * | 12/2004 | Fukayama | 257/84 |
| 6,902,285 B2 | * | 6/2005 | Eiraku et al. | 362/26 |
| 7,118,265 B2 | * | 10/2006 | Cho | 362/606 |
| 7,161,643 B2 | * | 1/2007 | Hayano | 349/58 |
| 7,184,110 B2 | * | 2/2007 | Kim et al. | 349/58 |
| 7,224,416 B2 | * | 5/2007 | Cha et al. | 349/60 |
| 7,248,307 B2 | * | 7/2007 | Han | 349/58 |
| 2003/0179580 A1 | | 9/2003 | Ito et al. | |

FOREIGN PATENT DOCUMENTS

CN 1598668 A 3/2005
KR 1020050020248 A 3/2005

* cited by examiner

*Primary Examiner*—Gunyoung T Lee
(74) *Attorney, Agent, or Firm*—Innovation Counsel LLP

(57) ABSTRACT

A backlight assembly that does not use a bottom chassis is presented. The absence of bottom chassis reduces manufacturing cost, simplifies the assembly process, and facilitates heat dissipation. The backlight assembly includes a lamp, a light guide plate, a mold frame and a securing mold. The lamp unit includes a lamp that generates light and a lamp cover that partially encloses the lamp. The light guide plate receives the light from the lamp unit and guides the light toward the front of the backlight assembly. The mold frame receives the lamp unit and the light guide plate through an open portion. The securing mold is coupled to the lamp unit and combines with the mold frame to secure the first lamp unit. The backlight assembly relies on one mold frame to hold its components together.

22 Claims, 10 Drawing Sheets

BACKLIGHT ASSEMBLY WITHOUT A BOTTOM CHASSIS

CROSS REFERENCE TO RELATED APPLICATIONS

This application relies for priority upon Korean Patent Application No. 2005-77660 filed on Aug. 24, 2005, the content of which is herein incorporated by reference in its entirety.

BACKGROUND OF THE INVENTION

1. Field of the Invention

The present invention relates generally to a backlight assembly and particularly to a backlight assembly without a bottom chassis.

2. Description of the Related Art

In general, a liquid crystal display (LCD) device displays an image by using the optical and electrical characteristics of liquid crystal molecules. The liquid crystal molecules have anisotropic refractivity and anisotropic dielectric constant. LCD devices have various advantages such as thinness, low driving voltage, and low power consumption, especially in comparison with other display devices such as a cathode ray tube (CRT) device, or a plasma display panel (PDP) device. For these advantages, LCD devices are widely used in a notebook computer, a monitor, a television receiver set, a mobile phone, etc.

The LCD device includes a lower substrate, an upper substrate and a liquid crystal layer disposed between the lower and upper substrates. When electric field is applied to the liquid crystal layer, the arrangement of liquid crystal molecules of the liquid crystal layer is altered to change its optical transmissivity, thus displaying the desired image.

As is well known, the liquid crystal display panel itself does not emit light—it only controls the propagation of light through the layer. Thus, the LCD device frequently uses a backlight assembly that provides the liquid crystal display panel with light.

The backlight assembly includes a lamp unit, a light guide plate (LGP), at least one optical sheet, and a reflecting plate. The lamp unit includes a lamp that outputs light and a lamp cover that covers the lamp. The LGP guides the light from the lamp unit toward the liquid crystal display panel. The optical sheet is disposed above the LGP in order to enhance the luminance of light exiting from the LGP. The reflecting plate is disposed under the LGP.

The backlight assembly includes a bottom chassis and one or two mold frames. The bottom chassis receives the lamp unit, the LGP, the optical sheet and the reflecting plate. The mold frame is combined with the bottom chassis for securing the lamp unit, the LGP, the optical sheet and the reflecting plate.

As mentioned above, a conventional LCD device includes a bottom chassis and a mold frame. These components increase manufacturing cost and assembly time. Furthermore, the bottom chassis covers the edges of the LCD device, necessitating an additional wire arranging element for securing a lamp wire and compromising heat dissipation.

SUMMARY OF THE INVENTION

The present invention provides a backlight assembly without a bottom chassis that can be manufactured cost-effectively and assembled faster. The present invention also provides a liquid crystal display device having the above-mentioned backlight assembly.

In one aspect of the present invention, a backlight assembly includes a lamp unit, a light guide plate, a mold frame and a securing mold. The lamp unit includes a lamp that generates light and a lamp cover that partially encloses the lamp. The light guide plate receives the light from the lamp unit and guides the light toward the front of the backlight assembly. The mold frame receives the lamp unit and the light guide plate. The securing mold is coupled to the lamp unit and combined with the mold frame to secure the lamp unit.

In another aspect, the present invention is a backlight assembly that includes a lamp unit, a light guide plate, at least one optical sheet, a reflecting plate, a mold frame and a securing mold. The lamp unit includes a lamp that generates light and a lamp cover that partially encloses the lamp. The light guide plate receives the light provided from the lamp unit and guides the light toward the front of the backlight assembly. The optical sheet is disposed in front of the light guide plate. The reflecting plate is disposed behind the light guide plate. The mold frame receives the reflecting plate, the lamp unit, the light guide plate and the optical sheet, and has a lamp wire securing portion formed on a bottom portion of the mold frame and a sheet-securing protrusion and formed on a sidewall of the mold frame. The securing mold is coupled to the mold frame to secure the lamp.

In yet another aspect, the present invention is a liquid crystal display device includes a backlight assembly, a display unit and a top chassis. The backlight assembly generates light. The backlight assembly includes a lamp unit, a light guide plate, a mold frame, and a securing mold. The lamp unit includes a lamp that generates the light and a lamp cover the partially encloses the lamp. The light guide plate is positioned to receive the light generated from the lamp unit and guide the light toward the front of the backlight assembly. The mold frame receives the lamp unit and the light guide plate, and the securing mold is coupled to the lamp unit and combined with the mold frame. The display unit includes a liquid crystal display panel and a driving circuit part. The liquid crystal display panel is disposed in front of the backlight assembly to display an image. The driving circuit part drives the liquid crystal display panel. The top chassis secures the display unit to the backlight assembly.

BRIEF DESCRIPTION OF THE DRAWINGS

The above and other advantages of the present invention will become readily apparent by reference to the following detailed description when considered in conjunction with the accompanying drawings, wherein.

DESCRIPTION OF THE EMBODIMENTS

Figure 1:
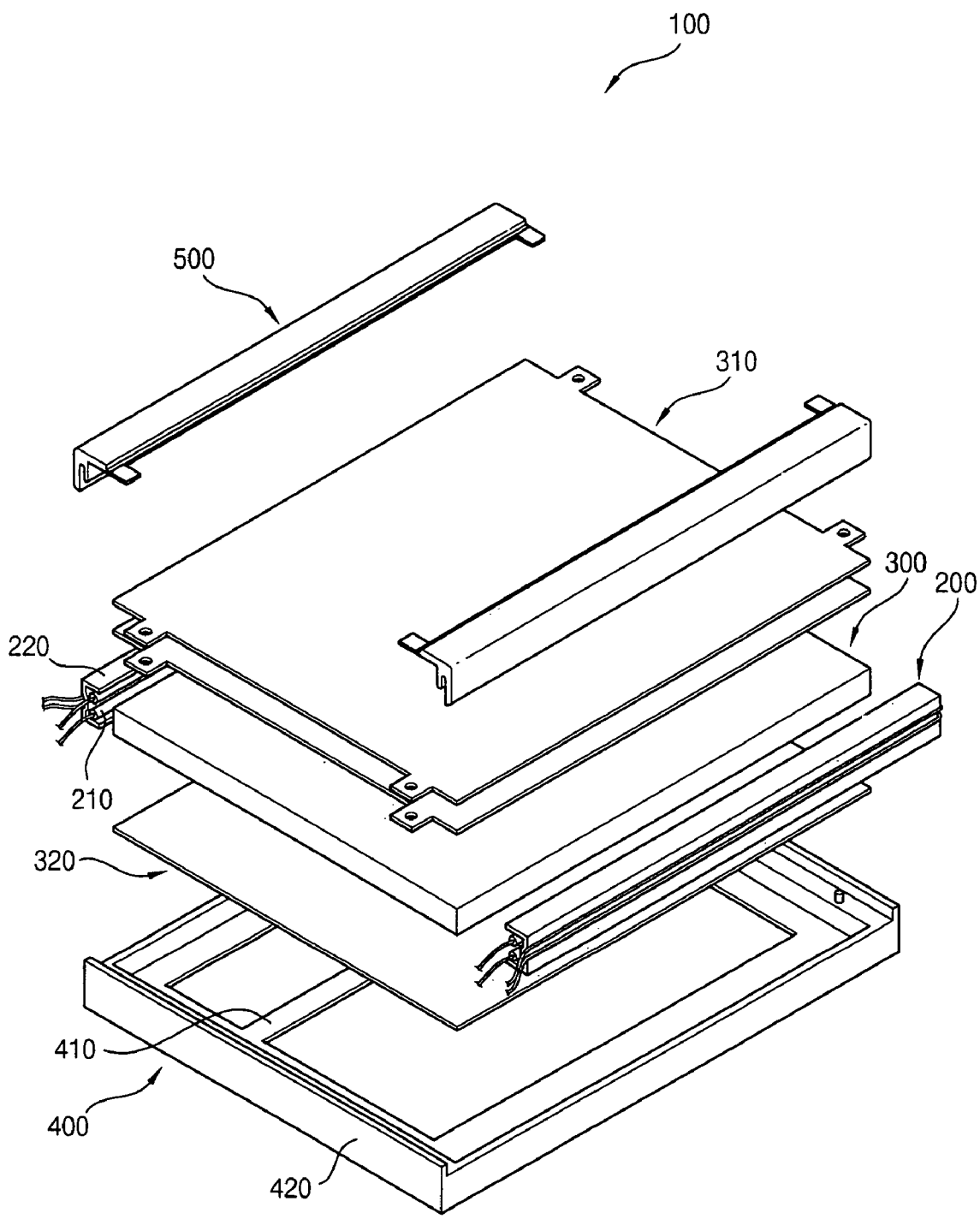
FIG. 1 is an exploded perspective view illustrating a backlight assembly according to an example embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 2:
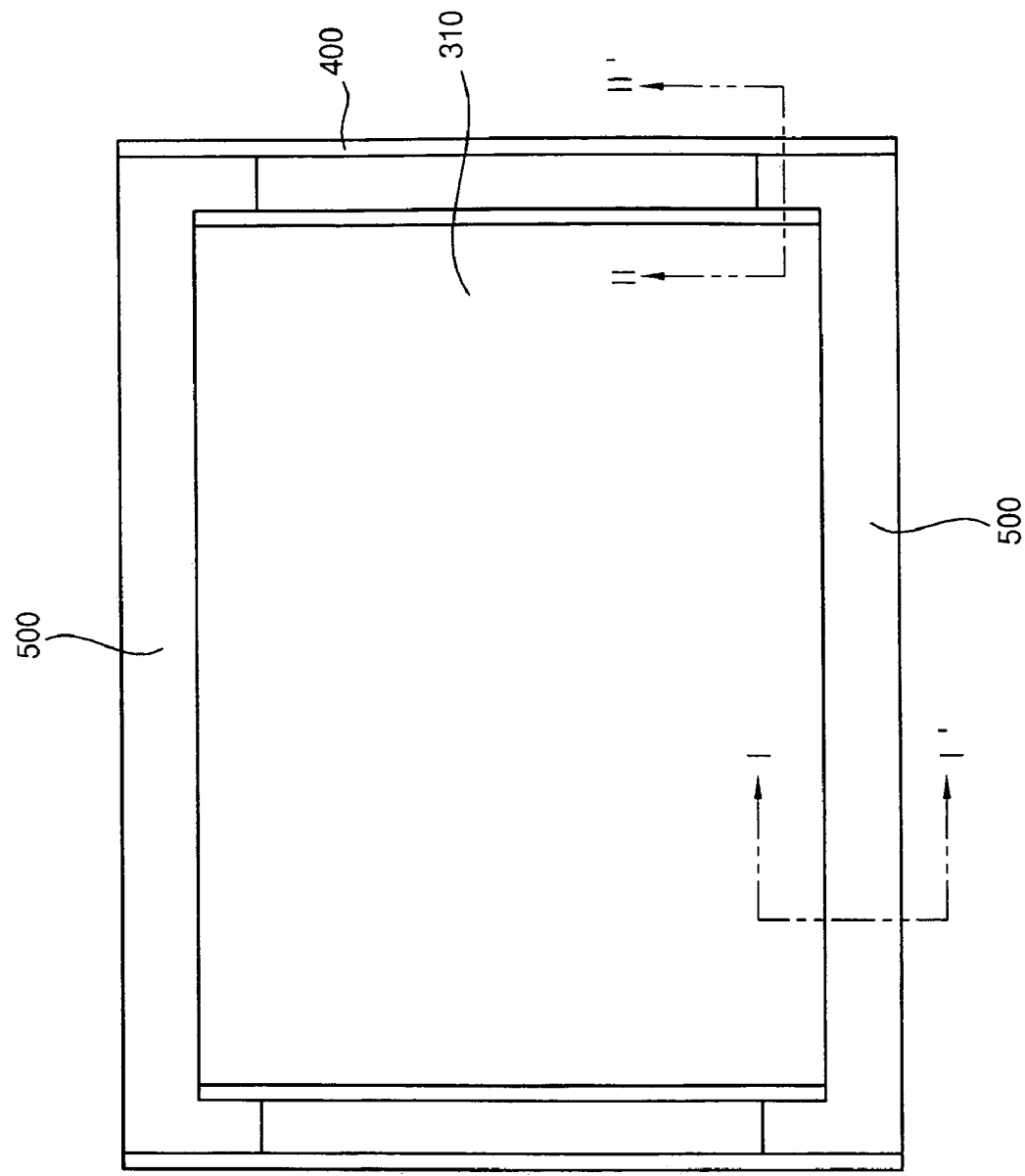
FIG. 2 is a plan view illustrating the backlight assembly in FIG. 1.

FIG. 1 is an exploded perspective view illustrating a backlight assembly according to an embodiment of the present invention. FIG. 2 is a plan view illustrating the backlight assembly in FIG. 1.

Referring to FIGS. 1 and 2, the backlight assembly 100 includes a lamp unit 200, an LGP 300, a mold frame 400 and a securing mold 500. In FIG. 1, the top surface of each component is the "front" and the bottom surface is the "back." Thus, a first component that is shown as being positioned under a second component is described as being "behind" the second component.

The lamp unit 200 includes a lamp 210 that generates light and a lamp cover 220 that covers the lamp 210. Two lamp units 200 are disposed at side portions of the LGP 300, as shown. In the embodiment shown, the lamp unit 200 is disposed along two longer side portions of the LGP 300. In an alternative embodiment, the lamp unit 200 may be positioned at only one side of the LGP 300.

In the embodiment shown, two lamps 210 are disposed in an inner space formed by the lamp cover 220. However, this is not a limitation of the invention and the number of lamps 210 in each lamp cover 220 may be varied. For example, one or three lamps 210 may be disposed in an inner space of the lamp cover 220.

The LGP 300 guides the light generated from the lamp unit 200 toward the front. The LGP 300 includes an optically transparent material. For example, the LGP 300 includes polymethylmethacrylate (PMMA).

A diffusing pattern (not shown) is formed on a rear surface of the LGP 300 in order to diffuse the light generated by the lamp unit 200. For example, the diffusing pattern may be a print pattern or a concavo-convex pattern. Light generated from the lamp unit 200 is dispersed by the diffusing pattern, and a portion of the light exits the LGP 300 through the front surface of the LGP 300.

The mold frame 400 receives the lamp unit 200 and the LGP 300 through an opening portion thereof. The mold frame 400 includes synthetic resins. The mold frame 400 is manufactured by, for example, an injection molding method using a molding case. The mold frame 400 includes a bottom portion 410 supporting the LGP 300 and a sidewall 420 corresponding to the lamp unit 200 and a side portion of the LGP 300.

The bottom portion 410 of the mold frame 400 has at least one opening in order to reduce the overall weight of the backlight assembly 100 and to improve the heat dissipation efficiency. The sidewall of the mold frame 400 extends from the edges of the bottom portion 410 in order to define a receiving space for receiving the lamp unit 200 and the LGP 300.

The securing mold 500 is disposed upon a lamp unit 200. The securing mold 500 is combined with the mold frame 400 in order to secure the lamp unit 200. The securing mold 500 covers a part of the lamp unit 200 and the edges of the LGP 300 in order to prevent the lamp unit 200 and LGP 300 received in the mold frame 400 from being separated from the mold frame 400.

In addition, the backlight assembly 100 further includes at least one optical sheet 310 that is disposed in front of the LGP 300 and a reflecting plate 320 that is disposed behind the LGP 300. The optical sheet 310 improves the optical characteristics of light from the LGP 300. The optical sheet 310 may include a diffusing sheet that diffuses light generated by the LGP 300, thereby improving luminance uniformity. The optical sheet 310 may include a prism sheet for improving the front-view luminance. The prism sheet directs the light from the LGP 300 toward the front. The optical sheet 310 may further include a reflection-polarizing sheet for improving the luminance of the light. The reflection-polarizing sheet transmits a portion of the light that satisfies a critical condition and reflects the remaining portion of the light.

In addition to what is described above, the backlight assembly 100 may include an optical sheet having whatever function that is useful to achieve the desired optical characteristics.

The reflecting plate 320 improves the overall light-usage efficiency by reflecting the light that leaked from the bottom face of the LGP 300. The reflecting plate 320 preferably includes a material having a relatively high reflectivity. For example, the reflecting plate 320 may include a white polyethylene terephthalate (PET) or polycarbonate (PC). Alternatively, the reflecting plate 320 may include a metal plate such as aluminum (Al), which is formed on a white reflecting sheet.

The reflecting plate 320 is disposed behind the LGP 300 and covers the opening(s) in the bottom portion 410 of the mold frame 400. Therefore, the reflecting plate 320 prevents a foreign substance from entering the backlight assembly 100 through the opening in the bottom portion 410 of the mold frame 400.

As mentioned above, the backlight assembly 100 includes the lamp unit 200, the LGP 300, the optical sheet 310 and the reflecting plate 320, disposed in the mold frame 400. As just one mold frame is used, manufacturing cost is decreased in comparison to backlight assemblies that include components such as a bottom chassis. By eliminating the need for extra fixing/framing components such as the bottom chassis, the invention simplifies the assembling process.

Figure 3:
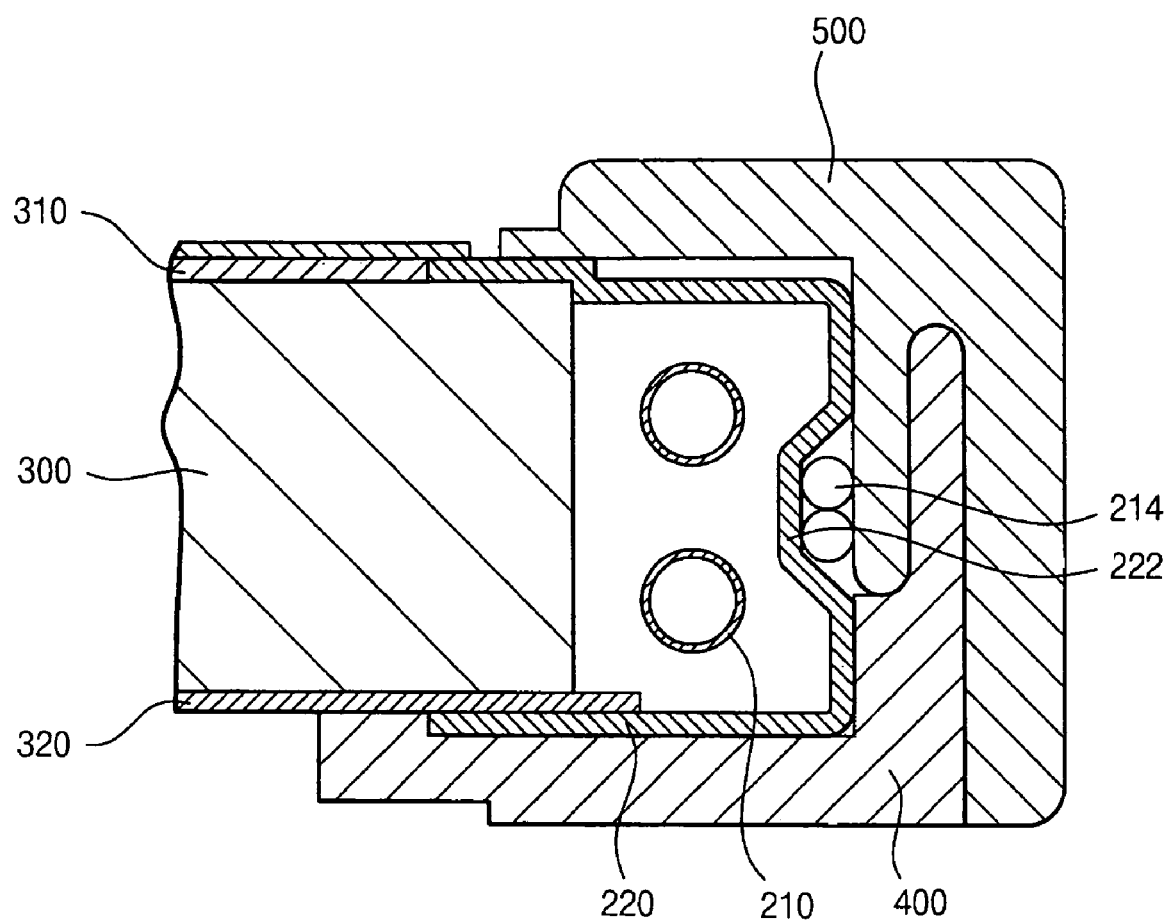
FIG. 3 is a cross-sectional view taken along the line I-I' in FIG. 2.
Figure 4:
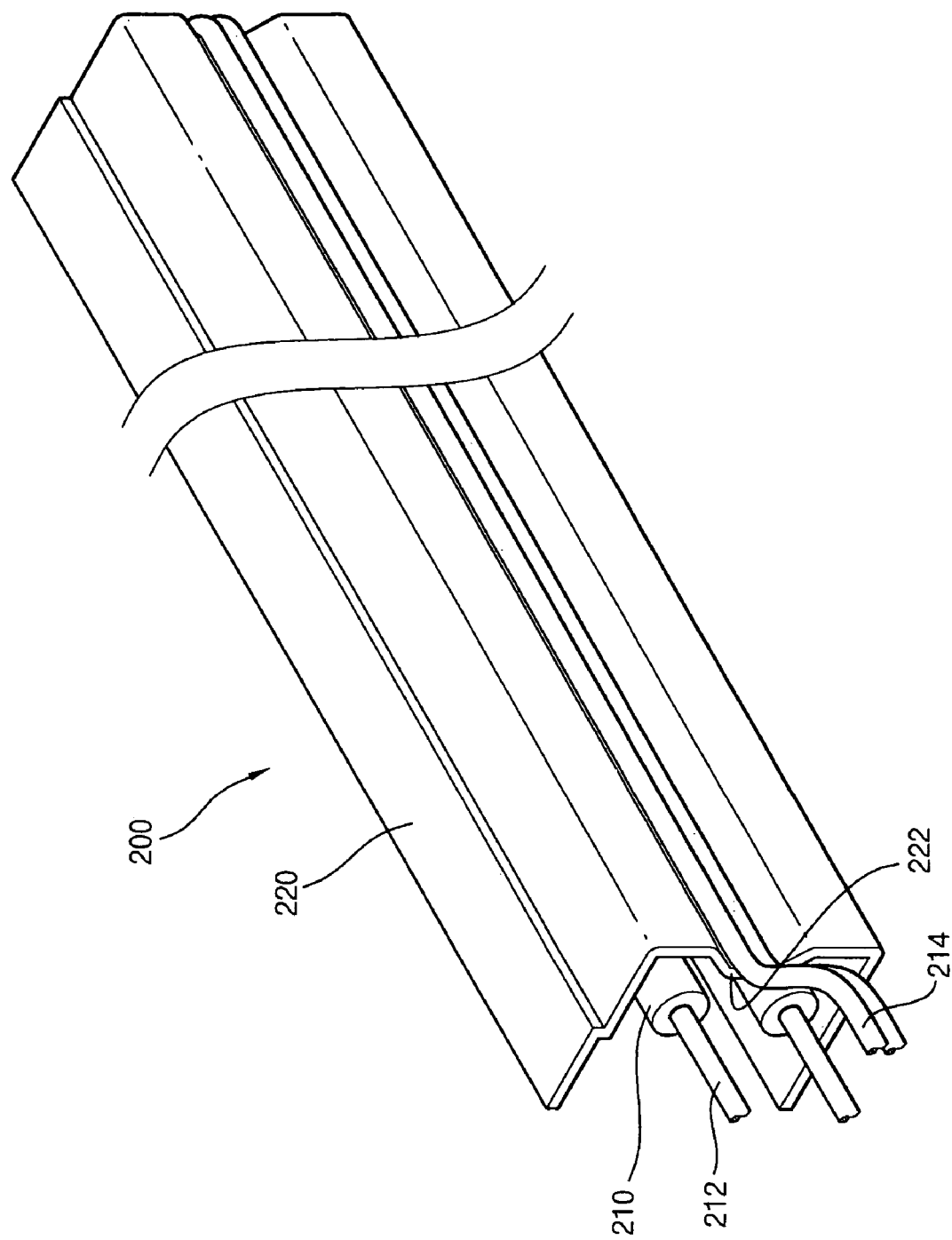
FIG. 4 is a perspective view illustrating the lamp unit in FIG. 1.

FIG. 3 is a cross-sectional view taken along the line I-I' in FIG. 2. FIG. 4 is a perspective view illustrating a lamp unit in FIG. 1.

Referring to FIGS. 3 and 4, the reflecting plate 320, the lamp unit 200, the LGP 300 and the optical sheet 310 are sequentially disposed in the receiving space of the mold frame 400.

As described above, the lamp unit 200 includes the lamp 210 generating light and the lamp cover 220 covering the lamp 210. In the embodiment shown, two lamps 210 are disposed in an inner space of the lamp cover 220.

The lamp 210 generates light when it receives a driving voltage. For example, a cold cathode fluorescent lamp (CCFL) having a thin and long cylinder shape may be employed as the lamp 210. Alternatively, an external electrode fluorescent lamp (EEFL) having an external electrode formed on two edge portions thereof may be employed as the lamp 210.

The lamp cover 220 covers portions of the lamp 210 and protects the lamp 210. The lamp cover 220 is preferably made of a material having a relatively high reflectivity. Alternatively, the lamp cover 220 is coated with a metal having a material having a relatively high reflectivity. The lamp cover 220 improves a light-using efficiency by reflecting the light generated from the lamp 210 toward the LGP 300.

In addition, a first lamp wire 212 and a second lamp wire 214 are electrically connected to a first end portion and a second end portion of the lamp 210, respectively, to apply a driving voltage to the lamp 210. The second lamp wire 214 that is connected to the second end portion of the lamp 210 is bent by about 360° to extend toward the first end portion of the first lamp wire 212. The portion of the second lamp wire that extends from the second end portion toward the first end portion of the lamp 210 is separated from the lamp 210 by a wire guide portion 222.

The wire guide portion 222 includes a groove designed to receive the second lamp wire 214. By extending the second lamp wire 214 toward the first lamp wire 212, any size increase of the backlight assembly that may have been caused by the second lamp wire 214 is minimized.

Figure 5:
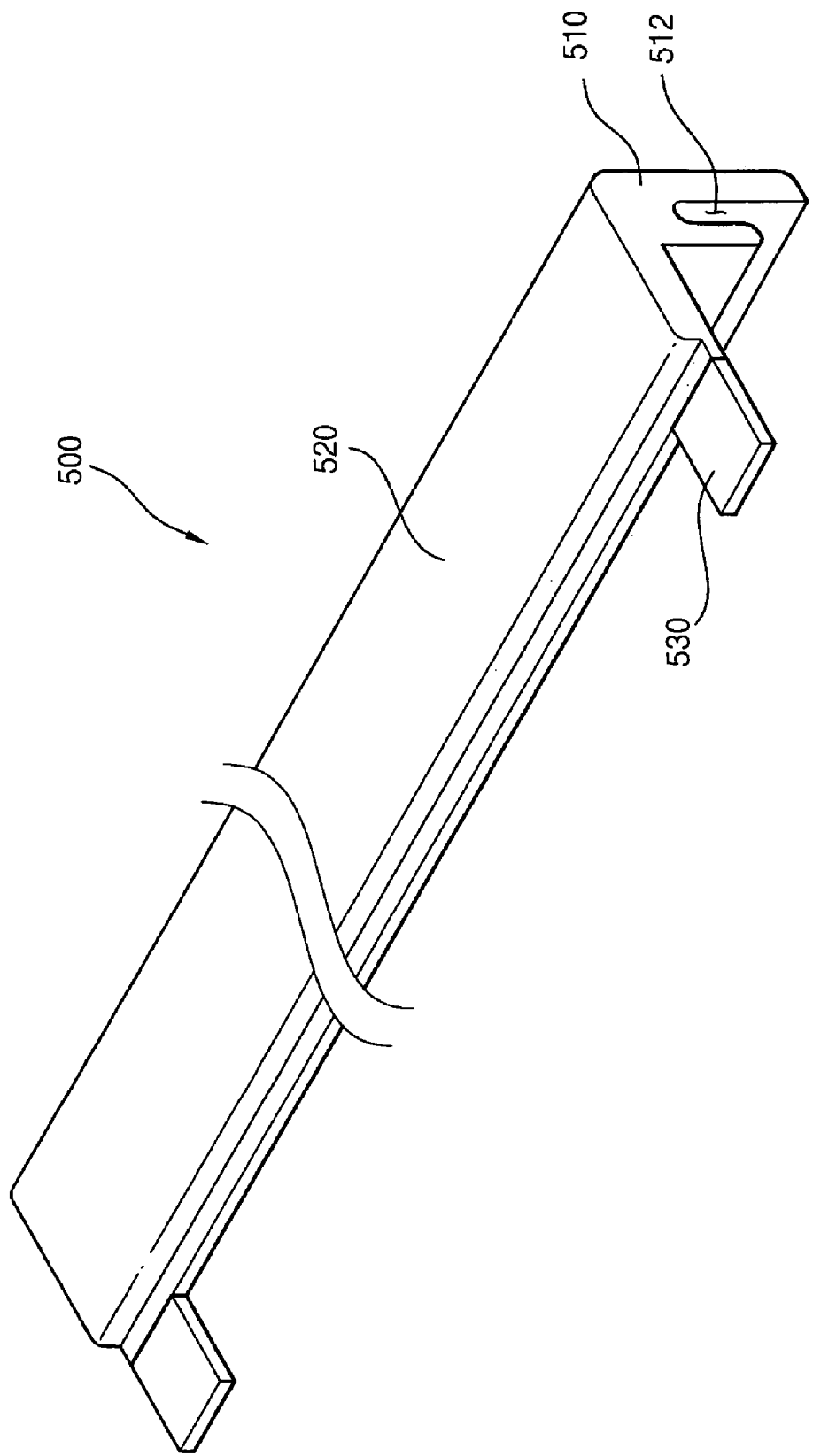
FIG. 5 is a perspective view illustrating the securing mold in FIG. 1.

FIG. 5 is a perspective view illustrating the securing mold in FIG. 1.

Referring to FIGS. 3 through 5, the securing mold 500 is combined with the mold frame 400 and secures the lamp unit 200. The securing mold 500 is combined with the mold frame 400 through, for example, a hook combination.

The securing mold 500 includes a connecting portion 510 that is designed to fit over the sidewall 420 of the mold frame 400 and a cover portion 520 that is designed to fit over the front part the lamp unit 200.

The connecting portion 510 has a groove 512 that is designed to receive the sidewall 420 of the mold frame 400 to improve a coupling stability and rigidity of the mold frame 400.

The cover portion 520 presses the edges of the LGP 300 against the bottom portion 410 of the mold frame 400 to prevent the lamp unit 200 and LGP 300 from separating from the mold frame 400.

The securing mold 500 also further includes a sheet securing portion 530 extending from the cover portion 520 to secure the optical sheet 310.

Figure 6:
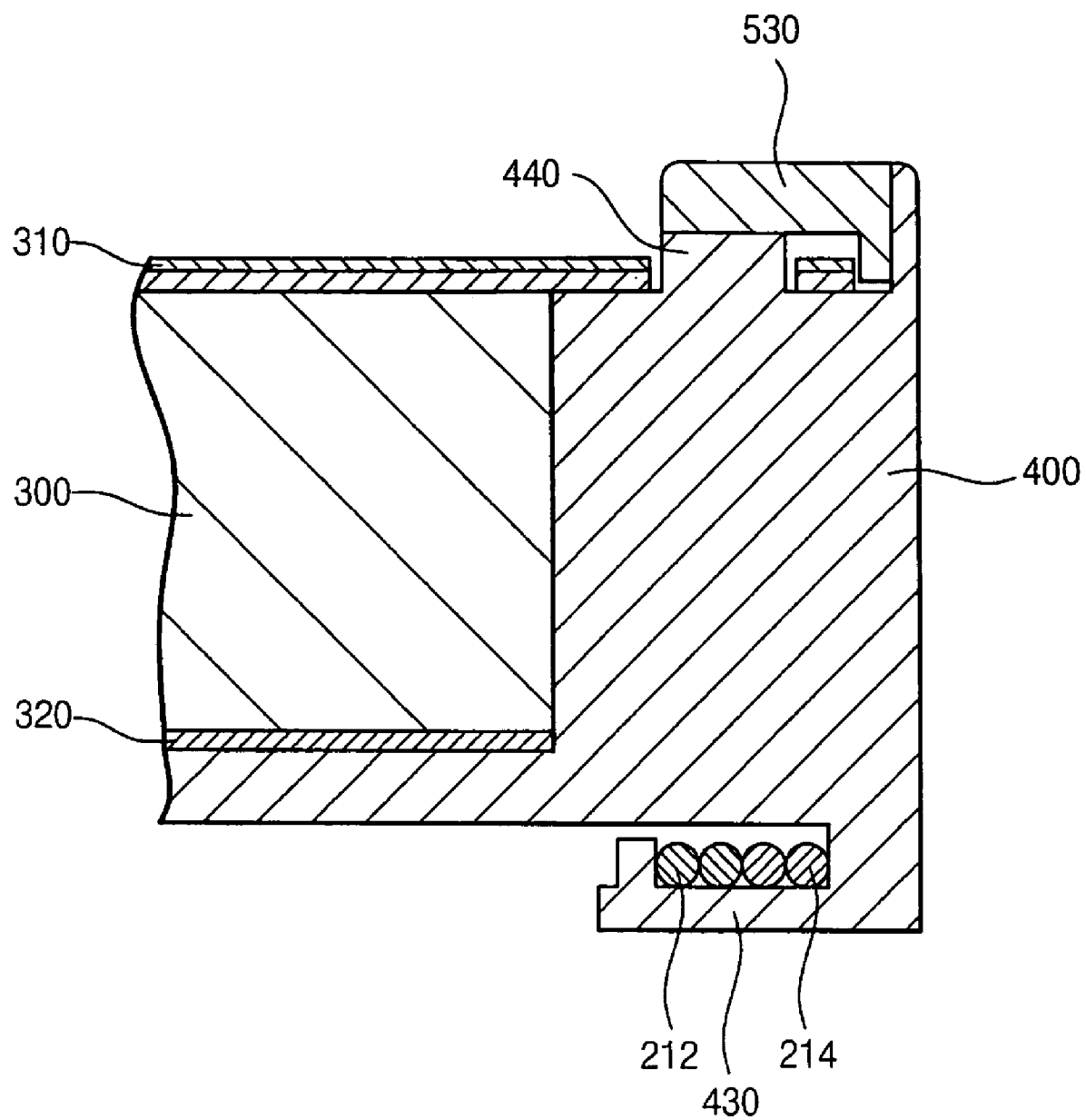
FIG. 6 is a cross-sectional view taken along the line II-II' in FIG. 3.
Figure 7:
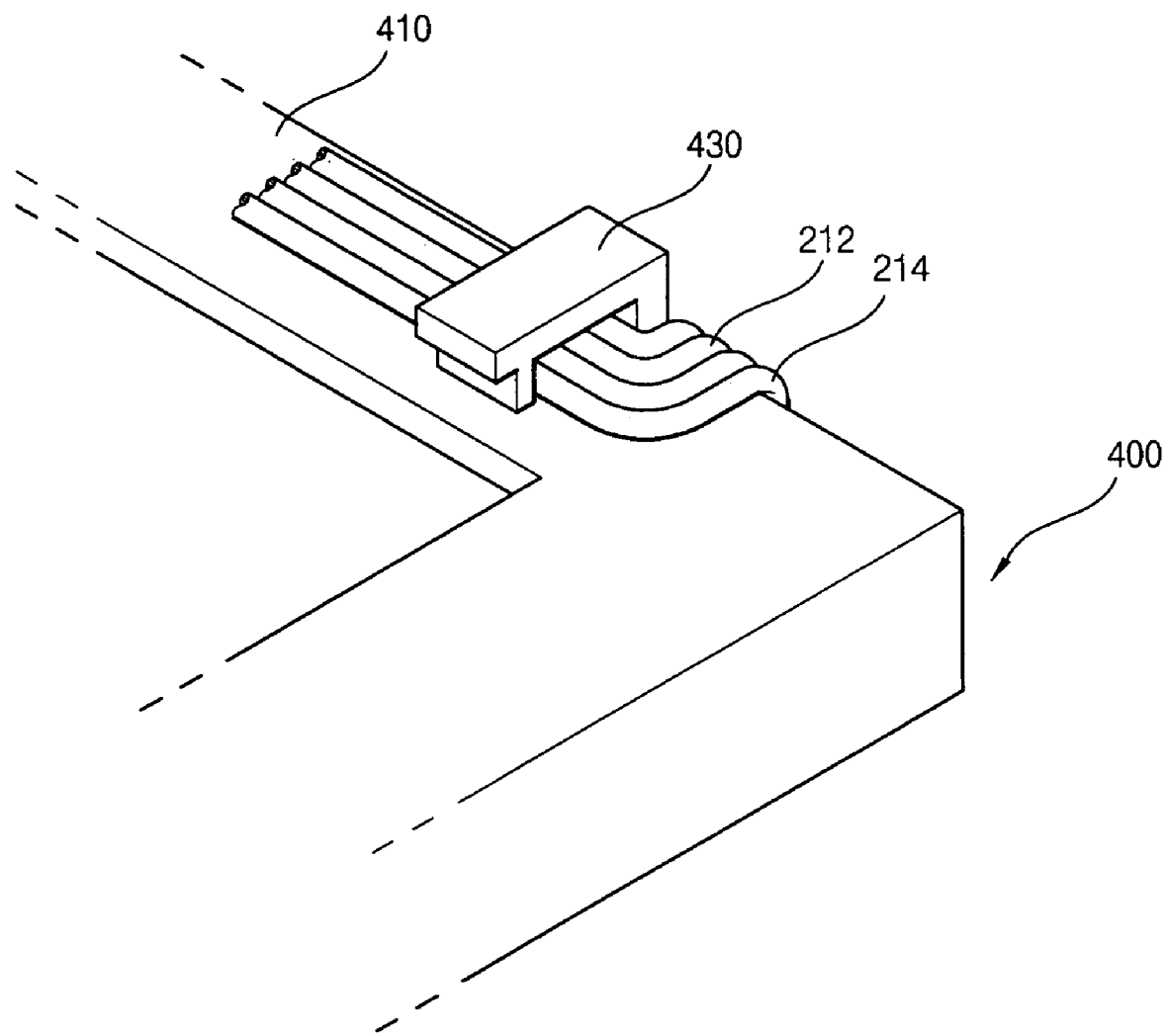
FIG. 7 is an exploded perspective view illustrating the wire securing portion in FIG. 6.

FIG. 6 is a cross-sectional view taken along the line II-II' in FIG. 3. FIG. 7 is an exploded perspective view illustrating a wire securing portion in FIG. 6.

Referring to FIGS. 6 and 7, the mold frame 400 includes a lamp wire securing portion 430 that secures a first lamp wire 212 and a second lamp wire 214.

The lamp wire securing portion 430 is formed at an outer surface of the bottom portion 410 of the mold frame 400. The lamp wire securing portion 430 protrudes from the bottom portion 410 of the mold frame 400 and forms a partial enclosure through which the first and second lamp wires 212 and 214 extend to be secured to the mold frame 400.

The first and second lamp wires 212 and 214 extend from ends of the lamp unit 200 (e.g., as shown in FIG. 4) toward the mold frame 400 and are stably secured through the lamp wire securing portion 430.

When two lamp units 200 are disposed at the first and second side portions of the LGP 300, respectively, two lamp wire securing portions 430 are formed at first and second side portions of the bottom portion 410 to receive the lamp wires from the respective lamp unit 200.

The lamp wire securing portion 430 may be integrally formed with the mold frame 400 through an injection-molding method. Therefore, an additional wire arranging element for securing the first and second lamp wires 212 and 214 is not required.

Figure 8:
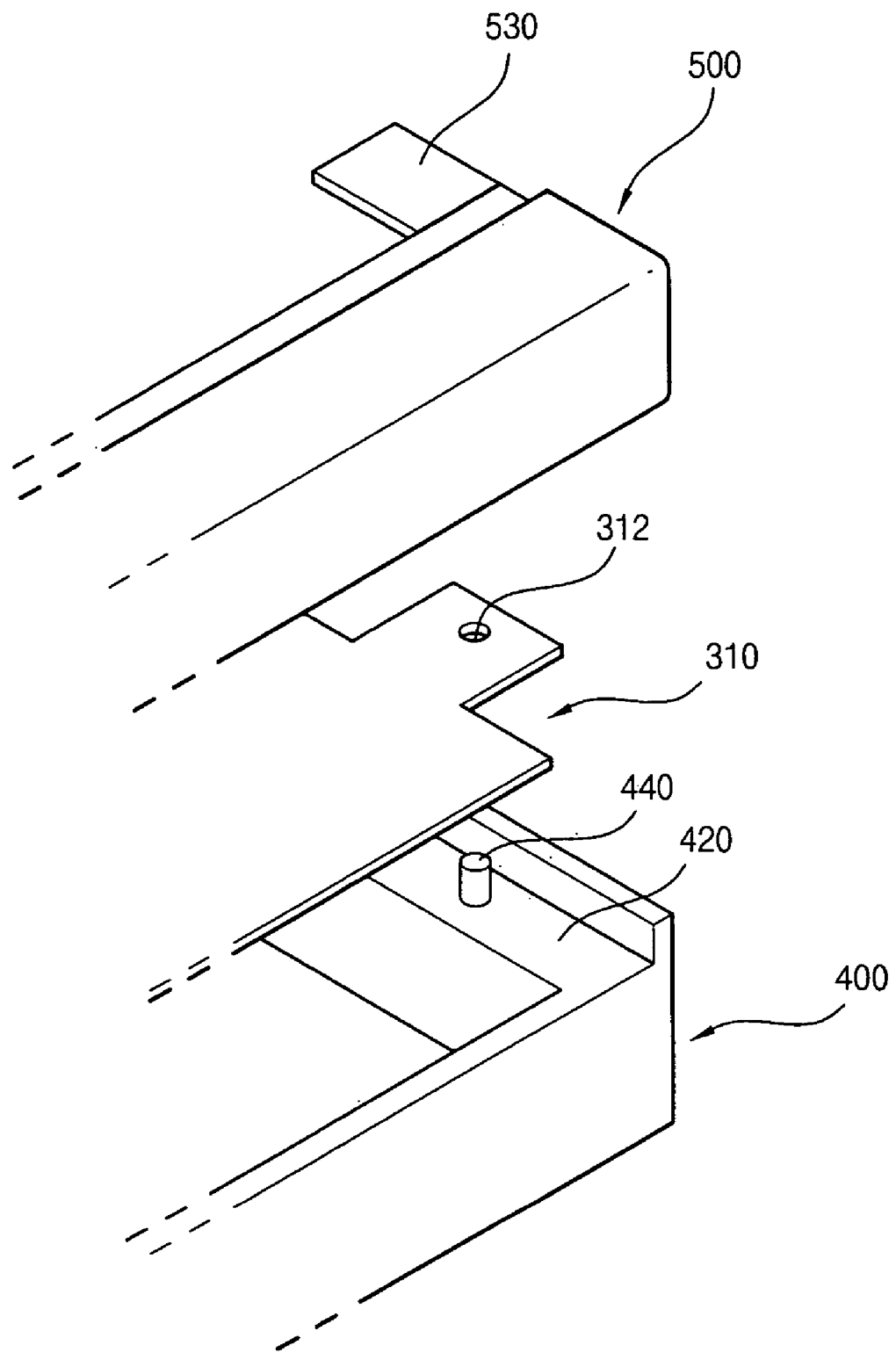
FIG. 8 is an exploded perspective view illustrating a securing structure of an optical sheet in FIG. 6.

FIG. 8 is an exploded perspective view illustrating the securing structure of an optical sheet in FIG. 6.

Referring to FIGS. 6 through 8, the mold frame 400 includes a sheet-securing protrusion 440 for securing the optical sheet 310.

The sheet-securing protrusion 440 is formed on a sidewall 420 of the mold frame 400. Alternatively, the sheet-securing protrusion 440 may be formed at the four corners of the mold frame 400. As yet another alternative, the sheet-securing protrusion 440 may be formed at two corners that are diagonally disposed.

In the embodiment that is shown, the sheet-securing protrusion 440 has a cylindrical shape and protrudes from the sidewall 420. The height of the sheet-securing protrusion 440 is preferably greater than the thickness of the optical sheet 310 so that it can extend through a securing hole 312 on the optical sheet 310 and stably secure the optical sheet 310. The securing hole 312 of the optical sheet 310 corresponds to the sheet-securing protrusion 440 of the mold frame 400. When the sheet-securing protrusion 440 is inserted into the securing hole 312, the optical sheet 310 is secured to the mold frame 400.

The shape of the securing hole 312 matches the cross-sectional shape of the sheet-securing protrusion 440. For easy insertion, the size of the securing hole 312 is preferably slightly larger than the size of the sheet-securing protrusion 440.

When the sheet-securing protrusion 400 of the mold frame 400 is inserted into the securing hole 312 of the optical sheet 310, a top portion of the sheet-securing protrusion 440 is covered by the sheet-securing portion 530 of the securing mold 500. Therefore, the sheet securing portion 530 of the securing mold 500 prevents separation of the optical sheet 310 from the mold frame 400.

Figure 9:
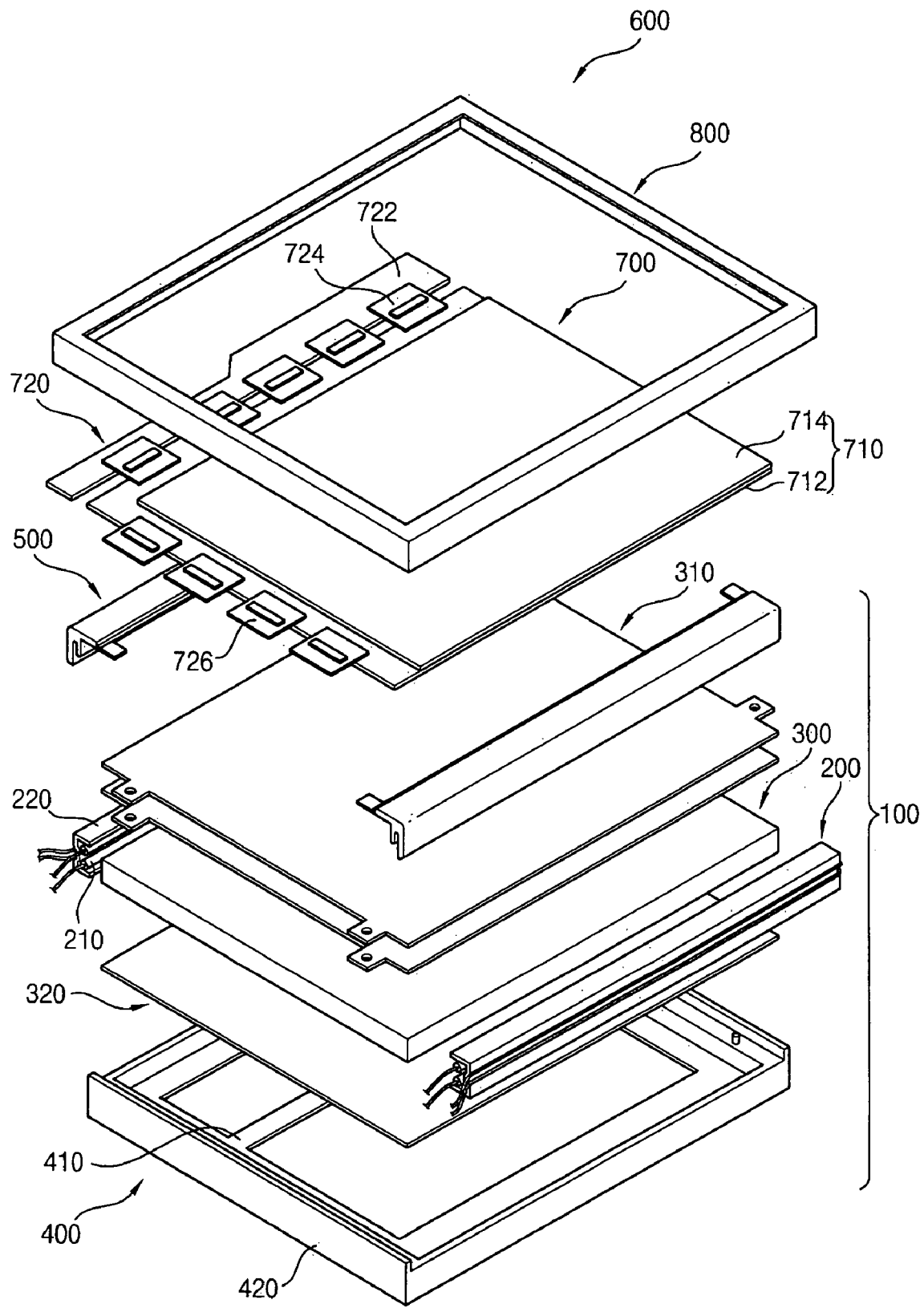
FIG. 9 is an exploded perspective view showing an LCD device according to an embodiment of the present invention.
Figure 10:
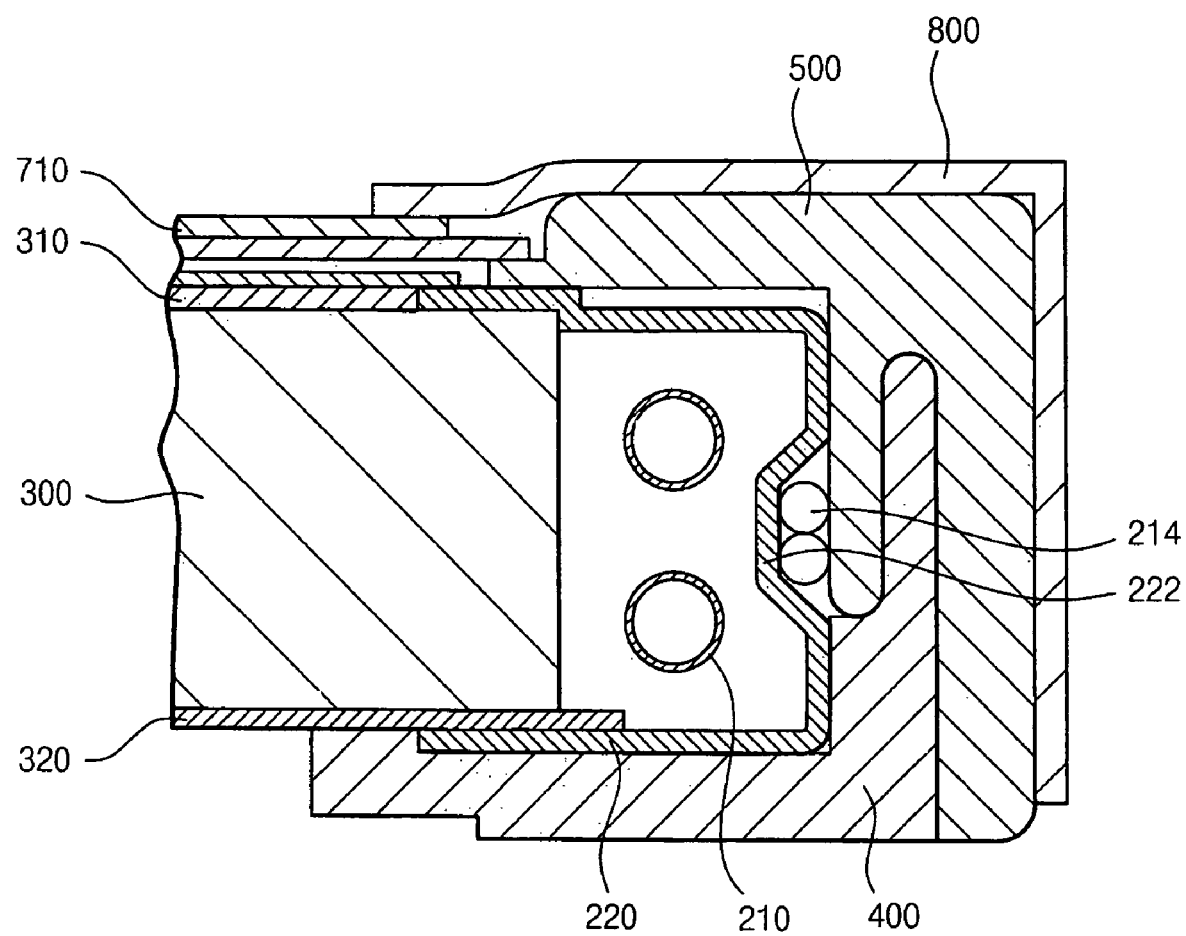
FIG. 10 is a cross-sectional view showing the LCD device in FIG. 9.

FIG. 9 is an exploded perspective view showing an LCD device according to an embodiment of the present invention. FIG. 10 is a cross-sectional view showing the LCD device in FIG. 9. In FIG. 9, "front" refers to the top surface of the components and "back" refers to the bottom surface of the components. A viewer views the images on the display unit 700 from the front.

Referring to FIGS. 9 and 10, the LCD device 600 includes a backlight assembly 100, a display unit 700 disposed over the backlight assembly 100 and a top chassis 800 securing the display unit 700. In FIGS. 9 and 10, the same reference numerals will be used to refer to the same or like parts as those described in FIGS. 1 through 8.

The display unit 700 includes a liquid crystal display panel 710 displaying an image using the light provided from the backlight assembly 100 and a driving circuit part 720 for driving the liquid crystal display panel 710.

The liquid crystal display panel 710 is disposed upon the optical sheet 310. The liquid crystal display panel 710 is stably secured to the other components of the LCD device 600 by the top chassis 800.

The liquid crystal display panel 710 includes a lower substrate 712, an upper substrate 714 and a liquid crystal display layer (not shown) that is disposed between the lower substrate 712 and the upper substrate 714.

The lower substrate 712 includes a plurality of thin film transistors (TFTs) that correspond to a switching element. The TFTs are arranged in a matrix configuration. For example, the lower substrate 712 includes a transparent glass to transmit light. Each of the TFTs includes a gate electrode that is electrically connected to one of the gate lines, a source electrode that is electrically connected to one of data lines, and a drain electrode that is electrically connected to a pixel electrode including an optically transparent and electrically conductive material.

The upper substrate 714 includes a red color filter, a green color filter and a blue color filter to generate various colors through combinations of red, green and blue colors. The red, green and blue color filters are formed as thin films. The upper substrate 714 may be a transparent glass with a common electrode, wherein the common electrode is made of an optically transparent and electrically conductive material so that light can pass through it.

When a gate voltage is applied to the gate electrode of the TFT, the TFT is turned on and data voltage is applied to the pixel electrode through the TFT. When the data voltage is applied to the pixel electrode, electric fields are generated between the pixel electrode and the common electrode to alter the orientation of liquid crystal molecules in the liquid crystal layer disposed between the lower substrate 712 and the upper substrate 714. When the orientation of liquid crystal molecules in the liquid crystal layer is altered, optical transmissivity of the liquid crystal layer is changed. Thus, when light generated from the backlight assembly 100 passes through the liquid crystal layer, the desired image is displayed by controlling light transmission through the liquid crystal layer.

The driving circuit part 720 includes a source printed circuit board 722, a data driving circuit film 724 and a gate driving circuit film 726. The source printed circuit board 722 outputs various signals for driving the liquid crystal display panel 710. The data driving circuit film 724 electrically connects the source printed circuit board 722 to the liquid crystal display panel 710. The gate driving circuit film 726 is electrically connected to the liquid crystal display panel 710.

The data driving circuit film 724 is electrically connected to a data line of the lower substrate 712, and the gate driving circuit film 726 is electrically connected to a gate line of the lower substrate 712.

Each of the data driving circuit film 724 and the gate driving circuit film 726 includes a driving chip outputting a driving signal for driving the liquid crystal display panel 710 in response to a control signal that is provided by the source printed circuit board 722. A tape carrier package (TCP) or a chip on film (COF) may be employed as the data driving circuit film 724 and the gate driving circuit film 726.

In addition, the driving circuit part 720 may further include a gate printed circuit board (not shown) that is electrically connected to the gate driving circuit film 726.

The top chassis 800 is combined with the mold frame 400 for securing the liquid crystal display panel 710. The data driving circuit film 724 is bent, so that the source printed circuit board 722 is disposed on the back surface of the mold frame 400. The top chassis 800 may be made of, for example, a metal having a relatively high strength that is difficult to deform.

According to the backlight assembly and the LCD device of the invention, the backlight assembly employs no bottom chassis and a mold frame holds the components together without the bottom chassis. Thus, manufacturing cost and assembly time are reduced.

Furthermore, the lamp wire securing portion is formed at the back portion of the mold frame so that the lamp wire is stably secured to the mold frame. This configuration avoids the need for a separate wire arranging element to secure the lamp wire.

Additionally, the sheet-securing protrusion for securing the optical sheet is formed on the mold frame and an upper portion of the sheet-securing protrusion is covered by the securing mold, thereby stably securing the optical sheet.

Furthermore, the bottom chassis, which usually covers the backlight assembly, is not required. Thus, heat dissipation is much easier.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A backlight assembly for providing a display panel with light, comprising:
    a first lamp unit including a lamp that generates light and a lamp cover that partially encloses the lamp;
    a light guide plate positioned to receive the light generated from the first lamp unit and guide the light toward the front of the backlight assembly;
    a mold frame receiving the first lamp unit and the light guide plate; and
    a securing mold including:
        a connecting portion for coupling with the mold frame; and
        a cover portion extending from the connecting portion and disposed between the first lamp unit and the display panel to fix the first lamp unit between the mold frame and the securing mold.

2. The backlight assembly of claim 1, wherein the mold frame comprises:
    a bottom portion supporting the first lamp unit and the light guide plate; and
    a sidewall protruding from the bottom portion and designed to couple with the securing mold to hold the first lamp unit and a side portion of the light guide plate.

3. The backlight assembly of claim 2, wherein the bottom portion has at least one opening.

4. The backlight assembly of claim 2, wherein the mold frame has a lamp wire securing portion that is formed on a surface of the bottom portion.

5. The backlight assembly of claim 2, further comprising:
    at least one optical sheet disposed on one side of the light guide plate; and
    a reflecting plate disposed on the other side of the light guide plate.

6. The backlight assembly of claim 5, wherein the mold frame comprises a sheet-securing protrusion formed on the sidewall.

7. The backlight assembly of claim 6, wherein the optical sheet has a securing hole that is designed to fit with the sheet-securing protrusion on the mold frame.

8. The backlight assembly of claim 6, wherein the sheet-securing protrusion contacts the securing mold.

9. The backlight assembly of claim 2, wherein an upper portion of the sidewall is inserted into the securing mold so that the mold frame is combined with the securing mold.

10. The backlight assembly of claim 9, wherein
    the connecting portion has a groove which receives the upper portion of the sidewall; and
    the covering portion extends from an upper end of the connecting portion to cover the first lamp unit.

11. The backlight assembly of claim 1, further comprising a second lamp unit, wherein the first lamp unit is disposed at a first side of the light guide plate, and the second lamp unit is disposed at a second side of the light guide plate that is parallel to the first side.

12. The backlight assembly of claim 1, wherein the connecting portion and the cover portion are made of the same material.

13. A backlight assembly for providing a display panel with light, comprising:
    a lamp unit including a lamp that generates light and a lamp cover that partially encloses the lamp;
    a light guide plate positioned to receive the light generated from the lamp unit and guide the light toward the front of the backlight assembly;
    at least one optical sheet disposed in front of the light guide plate;
    a reflecting plate that is disposed behind the light guide plate;
    a mold frame receiving the reflecting plate, the lamp unit, the light guide plate and the optical sheet, the mold frame having a lamp wire securing portion and a sheet-securing protrusion, the lamp wire securing portion formed on a bottom portion of the mold frame and the sheet-securing protrusion formed on a sidewall of the mold frame; and
    a securing mold comprising:
    a connecting portion coupled to the mold frame; and
    a cover portion extending from the connecting portion and disposed between the first lamp unit and the display panel to fix the lamp unit between the mold frame and the securing mold.

14. The backlight assembly of claim 13, wherein the optical sheet has a securing hole that is designed to fit with the sheet-securing protrusion of the mold frame, and wherein the sheet-securing protrusion contacts the securing mold.

15. The backlight assembly of claim 13, wherein the connecting portion and the cover portion are made of the same material.

16. A liquid crystal display device comprising:
    a backlight assembly generating light, wherein the backlight assembly includes:
        a lamp unit including a lamp that generates the light an a lamp cover that partially encloses the lamp;
        a light guide plate positioned to receive the light generated from the lamp unit and guide the light toward the front of the backlight assembly;
        a mold frame receiving the lamp unit and the light guide plate; and
        a securing mold combined with the mold frame and including:
            a connecting portion combined with the mold frame;
            a cover portion extending from the connecting portion and disposed between the first lamp unit and the display panel to fix the first lamp unit between the mold frame and the securing mold;

a display unit including a liquid crystal display panel and a driving circuit part, the liquid crystal display panel displaying an image with the light and the driving circuit part driving the liquid crystal display panel; and a top chassis securing the display unit to the backlight assembly.

17. The liquid crystal display device of claim 16, wherein the mold frame comprises:

a bottom portion supporting the lamp unit and the light guide plate; and a sidewall protruding from the bottom portion and designed to couple with the securing mold to hold the lamp unit and a side portion of the light guide plate.

18. The liquid crystal display device of claim 17, wherein the mold frame has a lamp wire securing portion that is formed on a surface of the bottom portion.

19. The liquid crystal display device of claim 17, wherein the backlight assembly further comprises:

at least one optical sheet disposed on one side of the light guide plate; and a reflecting plate disposed on the other side of the light guide plate.

20. The liquid crystal display device of claim 19, wherein the mold frame has a sheet-securing protrusion formed on the sidewall, and the optical sheet has a securing hole designed to fit with the sheet-securing protrusion.

21. The liquid crystal display device of claim 20, wherein the sheet-securing protrusion contacts the securing mold.

22. The backlight assembly of claim 16, wherein the connecting portion and the cover portion are made of the same material.

* * * * *